United States Patent [19]

MacGregor

[11] 4,162,950

[45] Jul. 31, 1979

[54] TREATMENT OF EFFLUENTS

[75] Inventor: John J. MacGregor, Tokers Green, England

[73] Assignee: Matthey Rustenburg Refiners (Proprietary) Limited, Johannesburg, South Africa

[21] Appl. No.: 942,814

[22] Filed: Sep. 15, 1978

Related U.S. Application Data

[63] Continuation of Ser. No. 815,005, Jul. 12, 1977, Pat. No. 4,127,458.

[30] Foreign Application Priority Data

Jul. 13, 1976 [GB] United Kingdom ............... 29093/76

[51] Int. Cl.[2] ............................ C25C 1/20

[52] U.S. Cl. ............................ 204/149; 204/47; 204/109

[58] Field of Search ..................... 204/149, 153, 46 R, 204/47, 109, 294

[56] References Cited

U.S. PATENT DOCUMENTS

| | | | |
|---|---|---|---|
| 3,244,605 | 4/1966 | Hotchkiss et al. | 204/153 |
| 3,551,318 | 12/1970 | Snook et al. | 204/294 X |
| 3,649,485 | 3/1972 | Chisholm | 204/95 |
| 3,784,456 | 1/1974 | Otto | 204/153 |
| 3,875,039 | 4/1975 | Matusek et al. | 204/294 X |
| 4,102,758 | 7/1978 | Gerber et al. | 204/294 X |

*Primary Examiner*—Arthur C. Prescott

*Attorney, Agent, or Firm*—Cushman, Darby & Cushman

[57] ABSTRACT

A process for recovering platinum group metal present as a stable complex dissolved in an aqueous effluent from a platinum group metals refinery which comprises (1) adjusting the pH of the effluent to an alkalinitz of at least 10; (2) heating to above 60° C.; (3) electrolyzing the effluent at said alkalinitz and temperature using an anode potential having a half-cell voltage of at least 7.5 volts and current density of at least 0.2 A/cm$^2$ so as to break down said complex by anodic oxidation and precipitate metal present in the complex; and (4) filtering off the precipitated metal.

2 Claims, No Drawings

TREATMENT OF EFFLUENTS

This is a continuation, of application Ser. No. 815,005 filed July 12, 1977 now U.S. Pat. No. 4,127,458.

This invention relates to the treatment of effluents; more particularly it relates to the destruction of compounds or complexes which are normally very stable and which pose problems in the purification and control of effluents.

Certain very stable and soluble compounds of metals are sometimes encountered which resist all normal chemical and electrochemical attempts to remove them from solution. These compounds usually occur only in small proportion relative to the total content of the compounded element. They are normally only detected as the difference between the results of wet analysis and instrumental analysis of the total sample and such differences are frequently explained as experimental error.

If the samples for instrumental analysis are given any concentration pre-treatment other than evaporation, the very stable compounds are not recovered in the concentrates. In the case of platinum group metals, however, the high intrinsic value make such small trace quantities worth recovering. In other cases recovery may be required to prevent infringement of effluent discharge limits. It is therefore an object of the invention to remove even very small traces of platinum group metals which remain in solution.

In the course of work to recover the values from the effluent from a platinum metals refinery, it was found that all the possible methods that gave excellent results on synthetic solutions, failed to do so when actual refinery effluent was treated. The treated effluent appeared barren on chemical analysis, but on evaporation to dryness spectrographic examination of the residue showed contents of up to 100 mg./liter of various metals in the solution. Since there is no way to isolate these compounds, their structure cannot be determined. However, their slow degradation is accompanied by the release of ammonia. Other evidence suggests the possibility of stable hydroxyl groups being involved.

According to a first aspect of the present invention a process for the destruction of stable complexes present in aqueous solution comprises electrolysis of the said solution, made alkaline to at least pH 10, between electrodes comprising one or more metals selected from the group consisting of Ru, Rh, Pd, Ir, Pt and alloys thereof at a voltage of at least 8 V and a current density of at least 0.2 A/cm$^2$.

Preferably the solution containing the stable complexes has already undergone conventional effluent treatment to remove metals in the form of dissolved salts or complexes. The composition of the residual effluent is then as given in Example 3. Stable complexes dealt with in this invention are usually present at the level of 100 ppm or less. Preferably also, if the solution is not already alkaline at a level of pH 10 or more, alkali is added to increase the pH to at least this value.

The electrolysis is preferably carried out at elevated temperature, suitably above 60° and preferably above 70° C. A preferred range of temperature for the solution undergoing electrolysis is 75°–80° C. In operation of the first aspect of the invention anodic oxidation is mainly responsible for the destruction of the complexes and it is necessary to use an anode potential of at least 5.5 volts, preferably at least 7.5 volts. (These figures are "half-cell" voltages.)

Preferred potential gradients in the solutions range from 1 to 0.5 V/cm, i.e. at 8 V the spacing of the electrodes may range from 8 to 16 cm apart. A convention separation is 10 cm apart.

The preferred range for the current density for the first aspect of the invention is 0.2–0.5 A/cm$^2$ and a convenient value to use is 0.25 A/cm$^2$ up to more than 6 A/cm$^2$ depending on the conductivity of the main part of the solution.

After treatment by the process according to the first aspect of the invention the effluent is found to have a composition given approximately by the "8 V" figures indicated in Example 1. Thus it can be seen that there still remains in solution a small proportion of platinum group metal complexes which are not removed by a process according to the first aspect of the invention.

According to a second aspect of the present invention a process for the destruction of stable complexes present in aqueous solution comprises electrolysis of the said solution according to the first aspect of the invention followed by a subsequent cathodic reduction using a cathode potential of at least 4.0 volts (half cell voltage).

Preferably the cathode potential is at least about 5.5 volts (half cell voltage). Apart from the obvious current reversal the conditions under which the second aspect electrolysis is carried out are the same as before.

For optimum results it is preferred, after carrying out the two stage process as defined in this specification as the second aspect of the invention, to repeat the first stage anodic oxidation electrolysis under the same conditions as before (anode potential of at least 5.5 V, preferably at least 7.5 volts; (half cell voltages)). Accordingly this constitutes a third aspect of the invention.

By the use of the third aspect of the invention (all three stages) which is preferred, it is found passible to produce a final discharge liquor containing less than 0.5 mg. per liter in total platinum group metals (see example 3). The metals are recovered as precipitate, partly as oxides, hydrated oxides or hydroxides and partly as metallic cathodic deposits. In operation of the process according to the present invention the metallic content of the solutions are found to be reduced to very low levels. When the filtered electrolyte is evaporated to dryness spectrographic examination of the residue shows a maximum of less than 1 part per million of total metals in the treated electrolyte.

The invention also includes precious metal recovered from the process in accordance with this invention.

EXAMPLE 1

A typical effluent from a platinum metals refinery containing the following constituents in milligrams per liter was used.

| | mg/l |
|---|---|
| Cu | 130 |
| Ni | 45 |
| Fe | 1 |
| Zn | 35 |
| Au | 4 |
| Ag | 15 |
| Pt | 190 |
| Pd | 200 |
| Ir | 2 |
| Ru | 14 |
| Rh | 25 |
| Os | 10 |

200 ml. samples were made alkaline to pH 10, heated to 80° C. and electrolysed for 2 hours between ½ inch diameter graphite rod electrodes at different total cell voltages. The electrolyte was filtered and the filtrate evaporated to dryness. Spectrographic analysis showed the filtrates to have contained the following quantities of metal after electrolysis at the voltage indicated.

| | mg/l | | | |
|---|---|---|---|---|
| | Pt | Pd | Rh | Base Metal |
| 2V | 98 | 130 | 20 | ND |
| 4V | 59.7 | 57.3 | 11 | ND |
| 6V | 57.2 | 57.2 | 11 | ND |
| 8V | 2 | 1 | 1 | ND |

In the above table, reference to ND means "not detected".

Precious metal was recovered from the solid filtered off by known chemical methods.

EXAMPLE 2

The experiments in Example 1 were repeated but with platinum used as the electrode material and the current density altered to 0.25 A/cm². This resulted in treated solutions containing 0.3 ppm Pt and less than 0.1 ppm Pd. No other metals were detectable by spectroscopic methods.

Precious metal was recovered from the solid filtered off by known chemical methods.

EXAMPLE 3

If the typical compositions from a platinum group metals refinery is subjected to conventional effluent control treatment such as precipitation, filtration and cementation the remaining effluent will be found to contain the following quantities:

| | mg/l |
|---|---|
| Cu | less than 1 |
| Ni | less than 1 |
| Fe | less than 1 |
| Zn | less than 1 |
| Au | 0.3 |
| Ag | 0.7 |
| Pt | 27.3 |
| Pd | 20.0 |
| Ir | 0.6 |
| Ru | 1.7 |
| Rh | 12.7 |
| Os | 1.1 |

After treatment according to the third aspect of the invention i.e. initial anodic oxidation at at least 7.5 volts for at least 120 minutes, followed by cathodic reduction at 5.5 volts or more for at least 120 minutes and repetition of the anodic oxidation at 7.5 volts for at least 120 minutes, the final liquor contained 0.3 mg. per liter Pt and 0.1 mg. per liter Pd.

What we claim is:

1. A process for recovering platinum group metal present as a stable complex dissolved in an aqueous effluent from a platinum group metals refinery which comprises (1) adjusting the pH of the effluent as necessary to an alkaline pH of at least 10; (2) heating the effluent to a temperature above 60° C.; (3) electrolyzing the effluent at said temperature and alkaline pH using an anode potential having a half-cell voltage of at least 7.5 volts and a current density of at least 0.2 A/cm² so as to break down said complex by anodic oxidation and precipitate metal present in the complex; and (4) filtering off the thus precipitated metal.

2. The process of claim 1 wherein the electrolyzing step (3) is carried out using a graphite electrode.

* * * * *

UNITED STATES PATENT AND TRADEMARK OFFICE

CERTIFICATE OF CORRECTION

PATENT NO. : 4,162,950

DATED : July 31, 1979

INVENTOR(S) : John James MacGregor

It is certified that error appears in the above—identified patent and that said Letters Patent is hereby corrected as shown below:

The term of this patent subsequent to July 12, 1994, has been disclaimed.

Signed and Sealed this

***Eighth* Day of *January 1980***

[SEAL]

*Attest:*

SIDNEY A. DIAMOND

*Attesting Officer* *Commissioner of Patents and Trademarks*